(12) United States Patent
Do et al.

(10) Patent No.: US 9,628,722 B2
(45) Date of Patent: Apr. 18, 2017

(54) SYSTEMS AND METHODS FOR EMBEDDING A FOREGROUND VIDEO INTO A BACKGROUND FEED BASED ON A CONTROL INPUT

(75) Inventors: Minh N. Do, Urbana, IL (US); Quang Il. Nguyen, Ho Chi Minh (VN); Dennis Lin, Urbana, IL (US); Sanjay I. Patel, Urbana, IL (US)

(73) Assignee: PERSONIFY, INC., Chicago, IL (US)

( * ) Notice: Subject to any disclaimer, the term of this patent is extended or adjusted under 35 U.S.C. 154(b) by 875 days.

(21) Appl. No.: 13/076,264

(22) Filed: Mar. 30, 2011

(65) Prior Publication Data
US 2011/0242277 A1    Oct. 6, 2011

Related U.S. Application Data

(60) Provisional application No. 61/318,969, filed on Mar. 30, 2010.

(51) Int. Cl.
| | |
|---|---|
| *H04N 5/272* | (2006.01) |
| *H04N 1/00* | (2006.01) |
| *H04N 13/04* | (2006.01) |
| *G06F 3/01* | (2006.01) |
| *G02B 27/00* | (2006.01) |
| *G06T 5/50* | (2006.01) |
| *G06T 7/00* | (2006.01) |

(Continued)

(52) U.S. Cl.
CPC ............. *H04N 5/272* (2013.01); *G06F 3/017* (2013.01); *G06T 5/50* (2013.01); *G06T 7/11* (2017.01); *G06T 7/194* (2017.01); *G02B 27/00* (2013.01); *G02B 27/0093* (2013.01); *G06F 3/01* (2013.01); *G06T 2207/10024* (2013.01); *G06T 2207/10028* (2013.01); *G06T 2207/20221* (2013.01); *H04N 1/00336* (2013.01); *H04N 13/04* (2013.01); *H04N 13/0468* (2013.01)

(58) Field of Classification Search
None
See application file for complete search history.

(56) References Cited

U.S. PATENT DOCUMENTS

| | | |
|---|---|---|
| 5,001,558 A | 3/1991 | Burley |
| 5,022,085 A | 6/1991 | Cok |

(Continued)

FOREIGN PATENT DOCUMENTS

WO    2013019259    2/2013

OTHER PUBLICATIONS

U.S. Appl. No. 13/083,470, filed Apr. 8, 2011, Quang H. Nguyen et al.

(Continued)

*Primary Examiner* — Anner Holder
*Assistant Examiner* — William Adrovel
(74) *Attorney, Agent, or Firm* — Invention Mine LLC

(57) ABSTRACT

A color image and a depth image of a live video are received. Each of the color image and the depth image are processed to identify the foreground and the background of the live video. The background of the live video is removed in order to create a foreground video that comprises the foreground of the live video. A control input may be received to control the embedding of the foreground video into a second background from a background feed. The background feed may also comprise virtual objects such that the foreground video may interact with the virtual objects.

26 Claims, 11 Drawing Sheets

(51) Int. Cl.
　　　*G06T 7/11*　　　(2017.01)
　　　*G06T 7/194*　　(2017.01)

(56) References Cited

U.S. PATENT DOCUMENTS

| | | | |
|---|---|---|---|
| 5,117,283 A | 5/1992 | Kroos | |
| 5,227,985 A | 7/1993 | DeMenthon | |
| 5,343,311 A | 8/1994 | Morag | |
| 5,506,946 A | 4/1996 | Bar | |
| 5,517,334 A | 5/1996 | Morag | |
| 5,534,917 A | 7/1996 | MacDougall | |
| 5,581,276 A | 12/1996 | Cipolla | |
| 5,631,697 A | 5/1997 | Nishimura | |
| 5,687,306 A | 11/1997 | Blank | |
| 5,875,040 A | 2/1999 | Matraszek | |
| 6,119,147 A | 9/2000 | Toomey | |
| 6,150,930 A | 11/2000 | Cooper | |
| 6,411,744 B1 | 6/2002 | Edwards | |
| 6,618,444 B1 | 9/2003 | Haskell | |
| 6,661,918 B1 | 12/2003 | Gordon | |
| 6,664,973 B1 | 12/2003 | Iwamoto | |
| 6,760,749 B1 | 7/2004 | Dunlap | |
| 6,798,407 B1 | 9/2004 | Benman | |
| 6,937,744 B1 | 8/2005 | Toyama | |
| 7,050,070 B2 | 5/2006 | Ida | |
| 7,124,164 B1 | 10/2006 | Chemtob | |
| 7,317,830 B1 | 1/2008 | Gordon | |
| 7,386,799 B1 | 6/2008 | Clanton | |
| 7,420,490 B2 | 9/2008 | Gupta | |
| 7,420,590 B2 | 9/2008 | Matusik | |
| 7,463,296 B2 | 12/2008 | Sun | |
| 7,512,262 B2 | 3/2009 | Criminisi | |
| 7,518,051 B2 | 4/2009 | Redmann | |
| 7,574,043 B2 | 8/2009 | Porikli | |
| 7,599,555 B2 | 10/2009 | McGuire | |
| 7,602,990 B2 | 10/2009 | Matusik | |
| 7,631,151 B2 | 12/2009 | Prahlad | |
| 7,633,511 B2 | 12/2009 | Shum | |
| 7,634,533 B2 | 12/2009 | Rudolph | |
| 7,668,371 B2 | 2/2010 | Dorai | |
| 7,676,081 B2 | 3/2010 | Blake | |
| 7,692,664 B2 | 4/2010 | Weiss | |
| 7,720,283 B2 | 5/2010 | Sun | |
| 7,742,650 B2 | 6/2010 | Xu | |
| 7,755,016 B2 | 7/2010 | Toda | |
| 7,773,136 B2 | 8/2010 | Ohyama | |
| 7,821,552 B2 | 10/2010 | Suzuki | |
| 7,831,087 B2 | 11/2010 | Harville | |
| 7,965,885 B2 | 6/2011 | Iwai | |
| 8,073,196 B2 | 12/2011 | Yuan | |
| 8,094,928 B2 | 1/2012 | Graepel | |
| 8,146,005 B2 | 3/2012 | Jones | |
| 8,175,379 B2 | 5/2012 | Wang | |
| 8,175,384 B1 | 5/2012 | Wang | |
| 8,204,316 B2 | 6/2012 | Panahpour | |
| 8,225,208 B2 | 7/2012 | Sprang | |
| 8,238,605 B2 | 8/2012 | Chien | |
| 8,249,333 B2 | 8/2012 | Agarwal | |
| 8,264,544 B1* | 9/2012 | Chang | H04N 5/272 348/169 |
| 8,300,890 B1 | 10/2012 | Gaikwad | |
| 8,300,938 B2 | 10/2012 | Can | |
| 8,320,666 B2 | 11/2012 | Gong | |
| 8,331,619 B2 | 12/2012 | Ikenoue | |
| 8,331,685 B2 | 12/2012 | Pettigrew | |
| 8,335,379 B2 | 12/2012 | Malik | |
| 8,345,082 B2 | 1/2013 | Tysso | |
| 8,355,379 B2 | 1/2013 | Thomas | |
| 8,363,908 B2 | 1/2013 | Steinberg | |
| 8,379,101 B2 | 2/2013 | Mathe | |
| 8,396,328 B2 | 3/2013 | Sandrew | |
| 8,406,494 B2 | 3/2013 | Zhan | |
| 8,411,149 B2 | 4/2013 | Maison | |
| 8,411,948 B2 | 4/2013 | Rother | |
| 8,422,769 B2 | 4/2013 | Rother | |
| 8,437,570 B2 | 5/2013 | Criminisi | |
| 8,446,459 B2 | 5/2013 | Fang | |
| 8,503,720 B2 | 8/2013 | Shotton | |
| 8,533,593 B2 | 9/2013 | Grossman | |
| 8,533,594 B2 | 9/2013 | Grossman | |
| 8,533,595 B2 | 9/2013 | Grossman | |
| 8,565,485 B2 | 10/2013 | Craig | |
| 8,588,515 B2 | 11/2013 | Bang | |
| 8,625,897 B2 | 1/2014 | Criminisi | |
| 8,643,701 B2 | 2/2014 | Nguyen | |
| 8,649,592 B2 | 2/2014 | Nguyen | |
| 8,649,932 B2 | 2/2014 | Mian | |
| 8,655,069 B2 | 2/2014 | Rother | |
| 8,659,658 B2 | 2/2014 | Vassigh | |
| 9,659,658 | 2/2014 | Vassigh | |
| 8,666,153 B2 | 3/2014 | Hung | |
| 8,682,072 B2 | 3/2014 | Sengamedu | |
| 8,701,002 B2 | 4/2014 | Grossman | |
| 8,723,914 B2 | 5/2014 | Mackie | |
| 8,818,028 B2 | 8/2014 | Nguyen | |
| 8,831,285 B2 | 9/2014 | Kang | |
| 8,854,412 B2 | 10/2014 | Tian | |
| 8,874,525 B2 | 10/2014 | Grossman | |
| 8,890,923 B2 | 11/2014 | Tian | |
| 8,890,929 B2 | 11/2014 | Paithankar | |
| 8,897,562 B2 | 11/2014 | Bai | |
| 8,913,847 B2 | 12/2014 | Tang | |
| 8,994,778 B2 | 3/2015 | Weiser | |
| 9,008,457 B2 | 4/2015 | Dikmen | |
| 9,053,573 B2 | 6/2015 | Lin | |
| 9,065,973 B2 | 6/2015 | Graham | |
| 9,084,928 B2 | 7/2015 | Klang | |
| 9,087,229 B2 | 7/2015 | Nguyen | |
| 9,088,692 B2 | 7/2015 | Carter | |
| 9,117,310 B2 | 8/2015 | Coene | |
| 9,269,153 B2 | 2/2016 | Gandolph | |
| 9,285,951 B2 | 3/2016 | Makofsky | |
| 9,336,610 B2 | 5/2016 | Ohashi | |
| 2002/0051491 A1 | 5/2002 | Challapali | |
| 2002/0158873 A1 | 10/2002 | Williamson | |
| 2004/0153671 A1 | 8/2004 | Schuyler | |
| 2006/0072022 A1 | 4/2006 | Iwai | |
| 2006/0193509 A1 | 8/2006 | Criminisi | |
| 2006/0259552 A1 | 11/2006 | Mock | |
| 2007/0036432 A1 | 2/2007 | Xu | |
| 2007/0110298 A1* | 5/2007 | Graepel et al. | 382/154 |
| 2007/0133880 A1 | 6/2007 | Sun | |
| 2008/0109724 A1* | 5/2008 | Gallmeier | G06F 3/017 715/716 |
| 2008/0181507 A1 | 7/2008 | Gope | |
| 2008/0266380 A1 | 10/2008 | Gorzynski | |
| 2008/0273751 A1 | 11/2008 | Yuan | |
| 2009/0003687 A1 | 1/2009 | Agarwal | |
| 2009/0044113 A1 | 2/2009 | Jones | |
| 2009/0199111 A1 | 8/2009 | Emori | |
| 2009/0244309 A1* | 10/2009 | Maison et al. | 348/222.1 |
| 2009/0245571 A1 | 10/2009 | Chien | |
| 2009/0249863 A1 | 10/2009 | Kim | |
| 2009/0284627 A1 | 11/2009 | Bando | |
| 2009/0300553 A1 | 12/2009 | Pettigrew | |
| 2010/0027961 A1* | 2/2010 | Gentile | G06T 5/50 386/278 |
| 2010/0046830 A1 | 2/2010 | Wang | |
| 2010/0053212 A1 | 3/2010 | Kang | |
| 2010/0128927 A1 | 5/2010 | Ikenoue | |
| 2010/0195898 A1* | 8/2010 | Bang et al. | 382/154 |
| 2010/0302376 A1 | 12/2010 | Boulanger | |
| 2011/0193939 A1* | 8/2011 | Vassigh et al. | 348/46 |
| 2011/0242277 A1 | 10/2011 | Do | |
| 2011/0249863 A1 | 10/2011 | Ohashi | |
| 2011/0249883 A1 | 10/2011 | Can | |
| 2012/0314077 A1 | 12/2012 | Clavenna, II | |
| 2013/0016097 A1 | 1/2013 | Coene | |
| 2013/0110565 A1 | 5/2013 | Means | |
| 2013/0129205 A1 | 5/2013 | Wang | |
| 2013/0142452 A1 | 6/2013 | Shionozaki | |
| 2013/0243313 A1 | 9/2013 | Civit | |
| 2014/0003719 A1 | 1/2014 | Bai | |
| 2014/0029788 A1 | 1/2014 | Kang | |

(56) References Cited

U.S. PATENT DOCUMENTS

| | | |
|---|---|---|
| 2014/0112547 A1 | 4/2014 | Peeper |
| 2014/0119642 A1 | 5/2014 | Lee |
| 2014/0153784 A1 | 6/2014 | Gandolph |
| 2014/0229850 A1 | 8/2014 | Makofsky |
| 2014/0300630 A1 | 10/2014 | Flider |
| 2014/0307056 A1 | 10/2014 | Romea |

OTHER PUBLICATIONS

U.S. Appl. No. 12/871,428, filed Aug. 30, 2010, Quang H. Nguyen et al.

Arbelaez, P, et ,al, "Contour detection and hierarchical image segmentation", Pattern Analysis and Machine Intelligence, IEEE Transactions on 33.4 (2011): 898-916.

Benezeth et al., "Review and Evaluation of Commonly-Implemented Background Subtraction Algorithms", 2008.

Carsten, R., et al., "Grabcut: Interactive foreground extraction using iterated graph cuts", ACM Transactions on Graphics (TOG) 23.3 (2004), pp. 309-314.

Crabb et al., "Real-Time Foreground Segmentation via Range and Color Imaging", 2008.

Gvili et al., "Depth Keying", 2003.

Kolmogorov, et al., "Bi-Layer Segmentation of Binocular Stereo Vision", IEEE, 2005.

Lee, D.S., "Effective Gaussian Mixture Learning for Video Background Subtraction", IEEE, May 2005.

Izquierdo' M. Ebroul. "Disparity/segmentation analysis: matching with an adaptive window and depth-driven segmentation." Circuits and Systems for Video Technology, IEEE Transactions on 9.4 (1999): 589-607.

Piccardi, M., "Background Subtraction Techniques: A Review", IEEE, 2004.

Wang, L., et al., "Tofcut: Towards robust real-time foreground extraction using a time-off camera.", Proc. Of 3DPVT, 2010.

Xu, F., et al., "Human detection using depth and gray images", Advanced Video and Signal Based Surveillance, 2003, Proceedings, IEEE Conference on IEEE, 2003.

Zhang' Q., et al., "Segmentation and tracking multiple objects under occlusion from multiview video." Image Processing, IEEE Transactions on 20.11 (2011), pp. 3308-3313.

Working screenshot of Snagit manufactured by Techsmith, released Apr. 18, 2014.

\* cited by examiner

SYSTEMS AND METHODS FOR EMBEDDING A FOREGROUND VIDEO INTO A BACKGROUND FEED BASED ON A CONTROL INPUT

RELATED APPLICATION

This application claims the benefit of U.S. Provisional Application No. 61/318,969 filed on Mar. 30, 2010 and entitled "Foreground Video Embedding."

BACKGROUND OF THE INVENTION

1. Field of the Invention

The present invention is related to the field of video processing, and more specifically towards systems and methods for embedding a foreground video into a background feed based on a control input.

2. Art Background

Background subtraction comprises the removal of a background from a live video, the results of which results in a video comprising the foreground of the live video. Conventional video processing techniques use such background subtraction processes for video conference applications. For example, the foreground of the live video may be extracted and then inserted or embedded into a second background.

Although conventional video processing techniques insert or embed a foreground from a live video into a second background, the conventional techniques do not provide a more robust video experience allowing greater user control or interaction with the second background or virtual objects comprised within the second background.

Accordingly, it is highly desirable to develop systems and methods for embedding a foreground video into a background feed based on a control input. The systems and methods may provide increased user interaction and control of the background feed as well as virtual objects comprised within the background feed.

SUMMARY OF THE INVENTION

The systems and methods disclosed herein embed a foreground video into a background feed. Specifically, the systems and methods may receive a depth image and a color image of a frame from a live video. The depth and color images may be used to detect the foreground and the background of the live video. The background may be subtracted and the resulting foreground video only comprises the foreground of the live video. A control input is received from the user to control the embedding of the foreground video into a second received background. In addition, the control input may comprise the user as depicted in the foreground video to interact with virtual objects from the background feed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The systems, methods, and circuits disclosed herein relate to video processing. Specifically, the systems and methods relate to foreground video embedding.

In the following detailed description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, and systems have not been described in detail to avoid unnecessarily obscuring aspects of the present invention.

Figure 1:
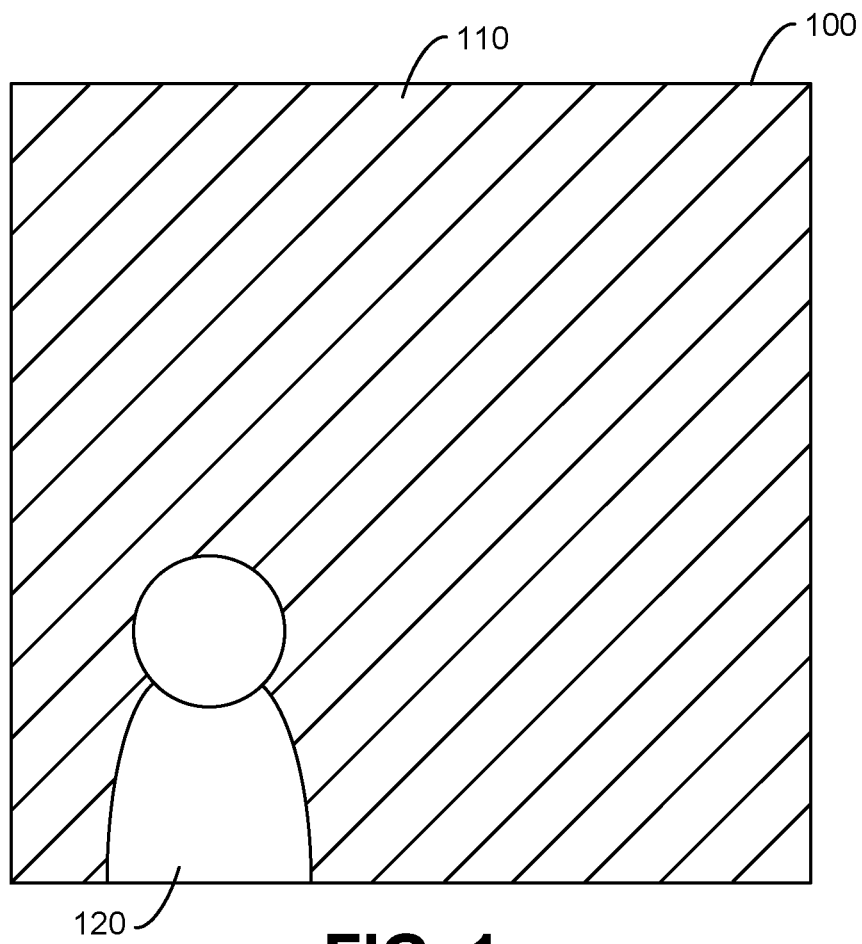
FIG. 1 illustrates an example video comprising a background portion and a foreground portion in accordance with some embodiments.

FIG. 1 illustrates an example video 100. In general, the example video 100 comprises a background portion 110 and a foreground portion 120. For example, the background portion 110 may comprise a wall, outdoor scene, or any other background scene and the foreground portion 120 may comprise a human user or presenter. However, the foreground portion 120 may comprise any identifiable object or entity. As such, the example video 100 may be divided into at least two portions—a background 110 and a foreground 120. For example, if the video 100 comprises a user speaking in a room, then the user may comprise the foreground portion 120 and a wall of the room may comprise the background portion 110.

Figure 2:
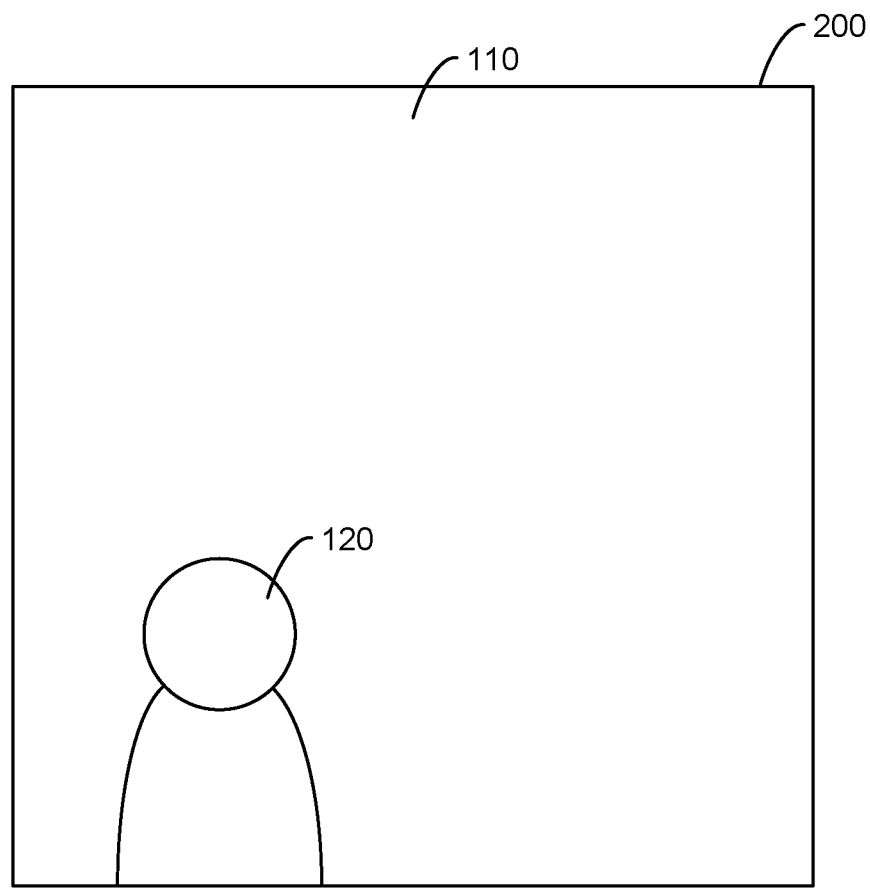
FIG. 2 illustrates an example video with the background portion subtracted or removed.

FIG. 2 illustrates an example foreground video 200. In general, the foreground video 200 comprises a foreground portion 120 of the video and the background portion 110 of the video has been subtracted or removed. As such, the foreground video approximates the video 100 with the removal or subtraction of the background portion 110.

Figure 3:
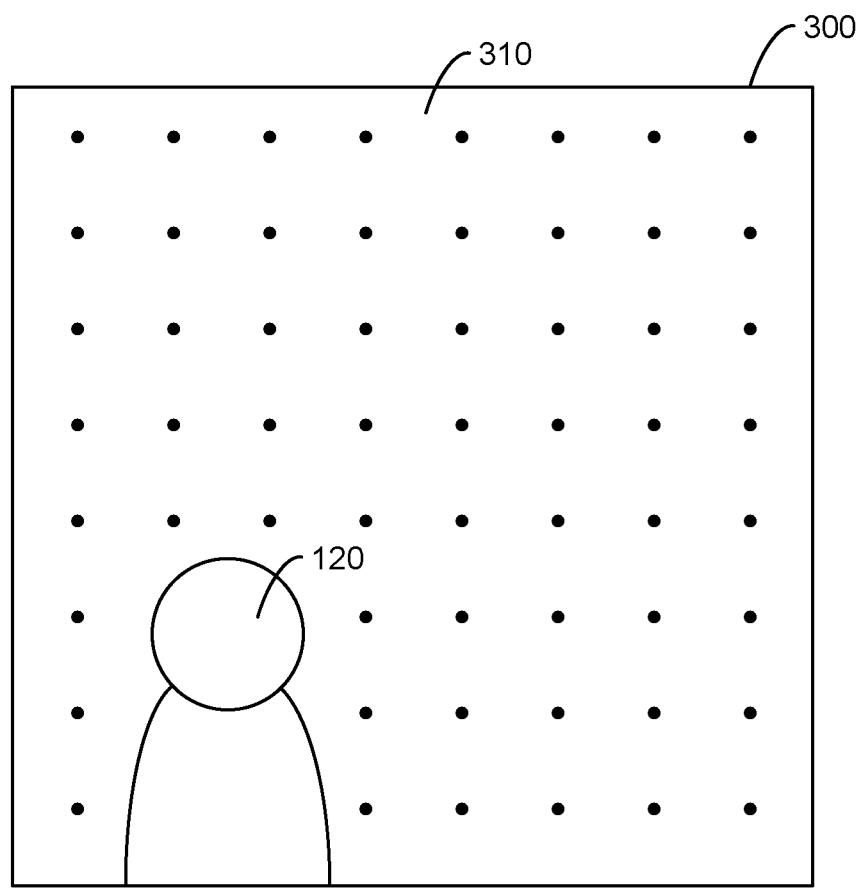
FIG. 3 illustrates an example composite video comprising a foreground video with a background feed in accordance with some embodiments.

FIG. 3 illustrates an example composite video 300. In general, the composite video 300 comprises the foreground video 120 embedded within a background. As seen in FIG. 3, the foreground video 120 is embedded within a background feed 310. For example, the foreground video 120 may comprise a user or presenter and the background feed 310 may comprise a presentation slide. In some embodiments, the background feed 310 may comprise any or all of an image, a presentation slide, web content, shared desktop, another video, pre-recorded video stream, live video stream, and/or a 3D virtual scene. As such, in some embodiments, a video of a presenter may be embedded into a presentation slide, shared desktop, or any other image or video.

Figure 4:
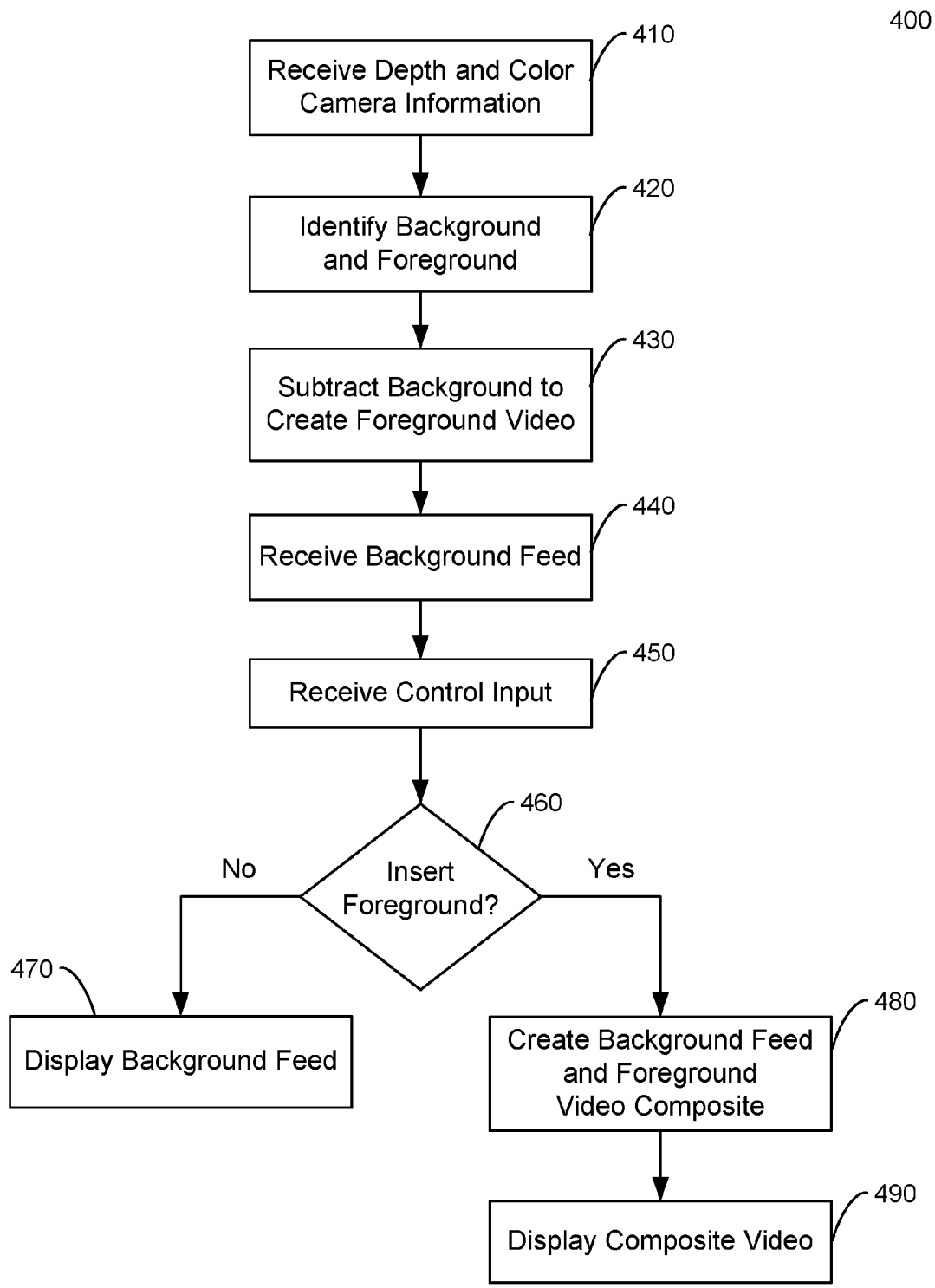
FIG. 4 is a flow diagram illustrating an example embodiment of a method for receiving depth and color camera information, background feed, and a control input for embedding a foreground video.

FIG. 4 is a flow diagram illustrating an example embodiment of a method 400 for foreground video embedding. In general, the method 400 receives depth and color camera image or information, a background feed, and a control input and creates a composite video comprising the foreground video and the background feed.

As seen in FIG. 4, at block 410, depth and color camera information of a video is received. In some embodiments, the depth information may relate to the distance to points in an image scene from a specific point. For example, the depth information may comprise the distance of each pixel of an image frame of a video from a sensor. The color information may comprise color pixel information of an image frame of a video. The depth and color camera information may be received from a three dimensional (3D) camera, depth camera, z-camera, range camera, or from a plurality of sources. For example, the color information may be received from a color camera and the depth information may be received from a depth camera. In some embodiments, the color information and depth information may be received from a single camera. For example, the color information may be received from an red-blue-green (RGB) sensor on a camera and the depth information may be received from an infrared (IR) sensor comprised within the same camera. Further details with regard to the camera are described with relation to FIG. 9. As such, the method 400 receives depth and color information of a video.

At block 420, the background portion and the foreground portion of the video are identified. For example, given an example of a human presenter in front of a wall, the foreground portion may comprise the human presenter and the background portion may comprise the wall. As such, at block 420, the depth information and/or color information is used to identify the background portion and the foreground portion of a video. At block 430, the background portion of the video is subtracted or removed to create a foreground video. For example, in the previous example of a human presenter in front of a wall, the image of the wall may be removed and the resulting video may only comprise the foreground portion (e.g., the human presenter). Further details of the background and foreground identification at block 420 and the background subtraction at block 430 are described in further detail below with relation to FIGS. 6 and 7.

At block 440, a background feed is received. In some embodiments, the background feed may comprise an image or a slide from a presentation or a series of images or slides from a presentation. For example, the background feed may comprise a series of presentation slides for which a human presenter will discuss. In the same or alternative embodiments, the background feed may comprise an image or view of a shared computer desktop, a pre-recorded video stream, live recording video stream, and/or a 3D virtual scene. As such, the background feed may comprise any image, video, or combination of at least one image or at least one video.

At block 450, a control input is received. The control input may comprise a gesture control input. For example, the control input may be a gesture from a human user such as a user who may be giving a presentation or a discussion. In some embodiments, the user may be depicted by the previously identified foreground video. As such, the control input may comprise a gesture from a user from the previously identified foreground video. Examples of gesture control input may comprise, but are not limited to, hand gestures, walking direction, user standing placement, and any other user movement. Further examples and details with regard to gesture control inputs are discussed below with relation to FIG. 8. In some embodiments, the control input may comprise a computer mouse control input. For example, the control input may comprise a computer mouse click or movement of a computer cursor by the computer mouse. In some embodiments, the control input may be provided by a remote control. For example, the control input may be received by the pressing of a button on the remote control.

Regardless of whether the input control is received from a user gesture, mouse control, and/or remote control, the input control may be used to control where to place, insert, and/or embed at least one foreground video into the new background provided by the background feed. Moreover, in some embodiments, the control input may be used to select a specific foreground video. For example, a plurality of foreground videos may be present and the control input may be used to select one of the plurality of foreground videos. In the same or alternative embodiments, the control input may be used to select a specific background from the background feed. For example, the background feed may comprise a plurality of videos and/or images. As such, the control input may be used to select which video of the background feed to use to insert or embed the foreground video within. In some embodiments, the control input may be used to change the background feed. For example, a gesture control input from a user depicted in the foreground video may prompt the background feed to change from a first presentation slide to a second presentation slide. As such, the gesture control input, mouse control input, and remote control input may be used to change the background feed. In some embodiments, control input may be used to change a portion of the background feed, as described in further detail below with relation to FIGS. 8, 9, and 10.

At block 460, a decision is made whether to insert or embed the foreground video into the background feed. The control input may comprise an action to embed the foreground video into the background feed, as described above with relation to block 450. If it is determined that the foreground video should not be embedded, then at block 470, the foreground video is not embedded into the background feed. As such, in some embodiments, the background feed may be displayed without the embedding or insertion of the previously identified foreground video. However, if it is determined that an insertion or embedding of the foreground video into the background feed is needed, then at block 480, a composite video comprising the background feed and the foreground video is created. In some embodiments, as previously described, the control input may provide instruction as to where to embed the foreground video within the background feed. At block 490, the composite video comprising the foreground video of the user and the background feed (e.g., presentation slides) are displayed.

Figure 5:
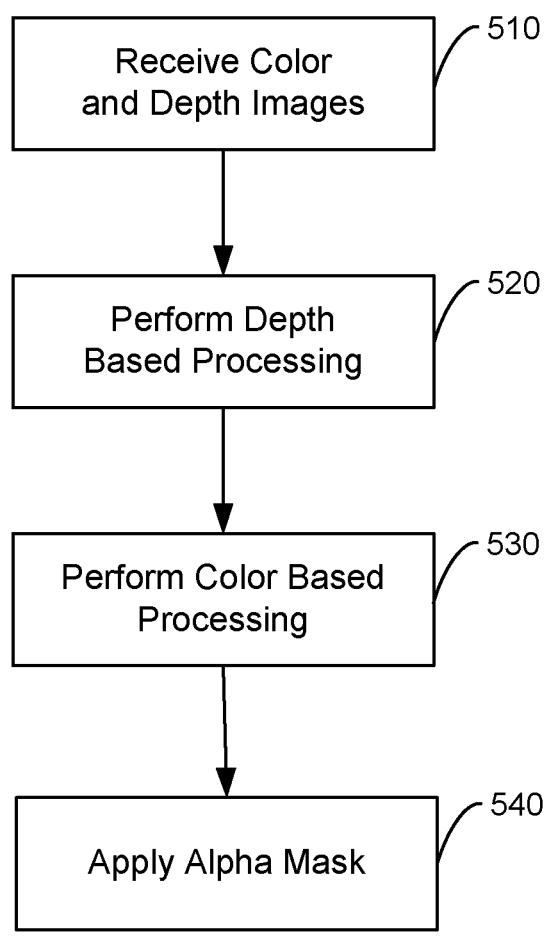
FIG. 5 is a flow diagram illustrating an example embodiment of a method for identifying a foreground portion and a background portion of a video.

FIG. 5 illustrates a method 500 for identifying a foreground portion and a background portion of a video. In some embodiments, the identified background portion may be removed to create a foreground video. In general, the method 600 processes a depth image and a color image to create the foreground video. At block 510, a color image and a depth image is received. At block 520, the depth image is processed as further discussed with relation to FIG. 6. At block 530, the color image is processed as discussed in more detail with relation to FIG. 7. Finally, at block 540, an alpha mask may be applied to the resulting image.

Figure 6:
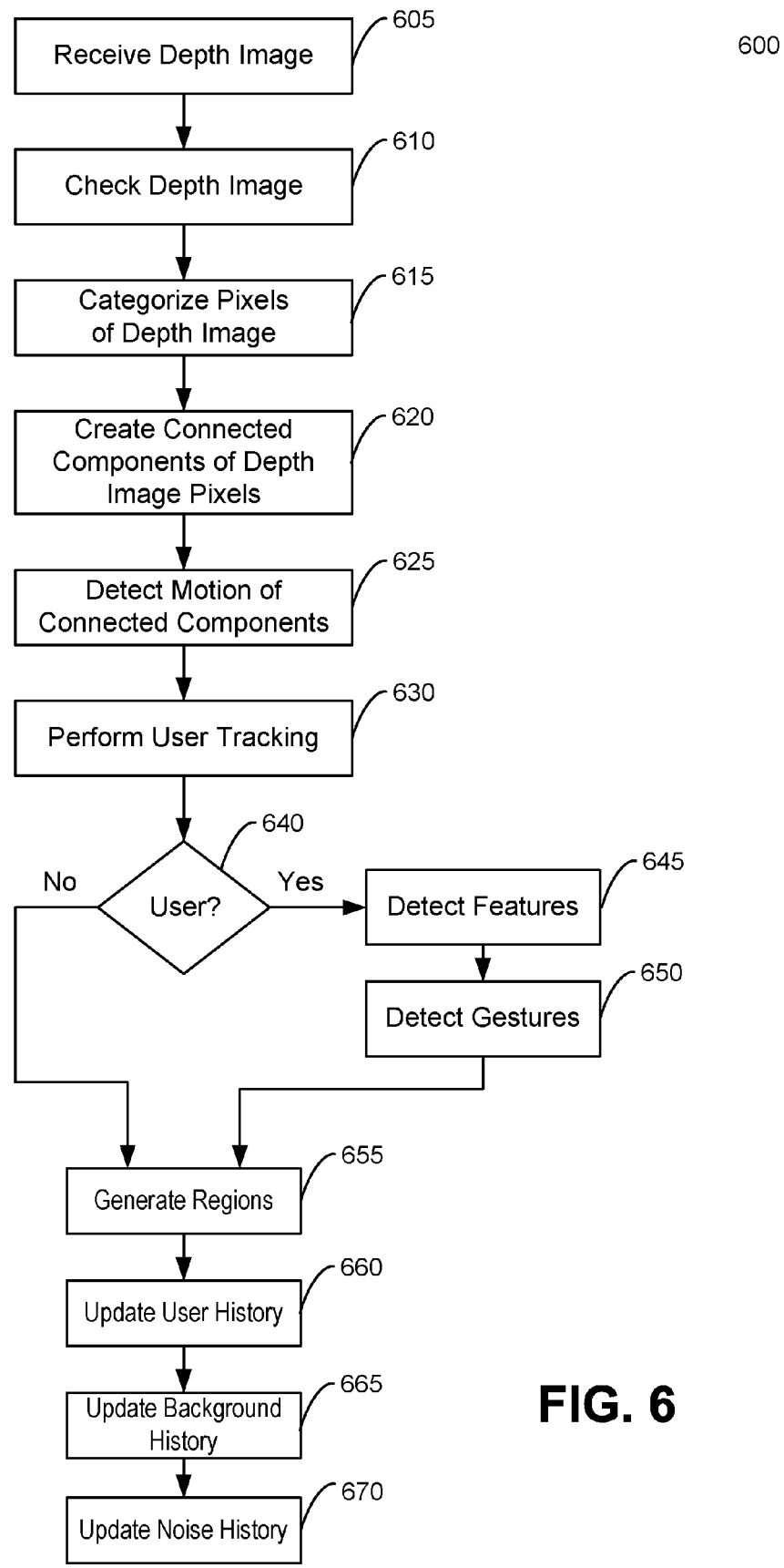
FIG. 6 is a flow diagram illustrating an example embodiment of a method for depth based processing for identifying a foreground portion and a background portion of a video.

FIG. 6 illustrates a method 600 for depth based processing for the identifying of a foreground portion and a background portion of a video. In some embodiments, the identified background portion may be removed to create a foreground video. In general, the method 500 receives depth image information and categorizes image pixels based on the depth image information.

As seen in FIG. 6, at block 605, a depth image is received. At block 610, the depth image is checked. In some embodiments, upon receiving a new depth image frame from a camera, the depth image frame is checked to determine whether the depth information is useful. For example, if the majority of pixels from the depth image comprise small or invalid values then the depth image frame may be considered to not be useful and as such may be discarded. In some embodiments, if a depth image frame is discarded then all pixels in the region map (described in more detail below) are set to 'unknown.' Moreover, in some embodiments, if a large number of consecutive depth image frames (e.g., 20 consecutive frames) comprise invalid depth information, then all depth histories (described in further detail below) and user information may be cleared or deleted.

At block 615, individual pixels of the depth image frame are categorized. Each pixel may be categorized or determined to belong to a section of the depth image frame. For example, each pixel may be categorized as unknown, background, foreground (e.g., a user), or as a bad pixel. In some embodiments, the categorization of the pixels is based on a background history, foreground history (e.g., user history), and a noise history. Each of the background history, foreground history, and noise history comprises an aggregate history of the background pixels, foreground pixels, and noise of each pixel as compiled from previous depth image frames. For each pixel of a received depth image frame, the current depth value is compared to the depth value in the background and foreground histories and ideally matched as either background or foreground. In some embodiments, how close a pixel's current depth value must match either of the background or foreground histories may be based upon a confidence level threshold and the noise level of the pixel. For example, to determine the best match (e.g., whether the pixel is a foreground or background) may comprise a cost calculated for each history and the history with the lowest cost may be chosen to be the pixel's section or categorization. If the depth value of a current pixel does not match any of the background or foreground history, then the pixel may be labeled as unknown. In some embodiments, if the pixel has an invalid depth value or a depth value beyond a threshold, then the pixel may be labeled as an invalid pixel (e.g., a bad pixel).

As seen in FIG. 6, at block 620, connected components of the depth image pixels are created. In some embodiments, the creation of connected components may group pixels into components based on the pixel's section or categorization and the pixel's depth value. For example, each pixel's depth value and categorization (i.e., foreground or background) may be compared with its neighboring pixels' depth value and categorization. If neighboring pixels share a common categorization and have similar depth values, then the neighboring pixels may be considered to be a part of a single component. However, for pixels that are categorized as having an invalid depth, the pixel's depth value is not compared with a neighboring pixel's depth value. As such, neighboring pixels with an invalid depth categorization will be grouped into a single component. In some embodiments, in order to reduce computational resources, disjoint sets are used to manage the connected components. Once the connected components are determined (e.g., components are created for foreground components, background components, etc.) each component comprising the pixels categorized as unknown are examined. A determination may be made to decide whether the unknown component is connected to a known component such as a background or foreground component. For example, for each unknown component, a list of connections to known categorized components is generated. If the unknown component is connected to one or more known categorized components, then the categorized component selected for the unknown component is based on the total number of connections and the total depth difference between the unknown component and the categorized component. For example, if an unknown component comprises a large number of connections to a background component and there is a small depth difference between the unknown component and the background component, then the unknown component may be categorized as a background component. As such, all pixels in the unknown component may be categorized as a background component and included in the background component. Thus, the previously unknown pixels are regrouped into the background component pixels.

At block 625 of FIG. 6, a motion detection of connected components is performed. The motion detection determines if a component is moving between depth image frames. A moving component may be determined to be a person (e.g., a user). As such, a user may be detected at block 625. In some embodiments, a camera may provide an infrared intensity image and as such the difference between the infrared intensity or depth value of the current image frame and a previous image frame may be calculated. If a pixel's infrared intensity increases by a significant amount and the pixel's value is below a specific threshold, then the pixel may be marked as moving. In embodiments where the camera does not provide an infrared intensity image, a pixel may be considered to be moving if its depth value decreases by a specific amount and the pixel depth value is below a specific threshold. Each component comprising a moving pixel may be further examined. If the number of moving pixels in a single component is above a predefined minimum amount and the percentage of moving pixels is not small relative to all pixels of the component, then the component may be tagged as being in motion and as such may comprise a user.

As seen in FIG. 6, at block 630, user tracking is performed on the components that have been marked as being in motion. In some embodiments, user tracking may be performed at every few frames and result in the analysis of all of the moving components. For example, for an unknown component, the user tracking may comprise checking the unknown component to determine whether the unknown component should be a foreground component or if it is a part of an existing foreground component (e.g., the unknown component is a user). If the unknown component is not part of an existing user, then the unknown component may be a new user and thus is analyzed through additional processes at blocks 645 and 650. Similar processes are performed for a background component that has been detected to be in motion. However, for a background component to be re-categorized as a foreground or user component, the background component must be approximate to a user's center of mass. Moreover, in some embodiments, a new user must have additional features detected and must be in motion. If a background component is determined to be a part of a user or a new user, then the component is removed from the background history.

The performance of the user tracking at block 630 may further comprise processing checks on foreground or user components. For example, if a foreground or user component is far from a user's center of mass, then it may be re-categorized as an unknown component. If a user component is close to another user's center of mass, then it may be removed from the current user and into the second user's history. In some embodiments, following the previously described processing steps, the user's information may be updated based on the current frame. For example, information related to a user's center of mass, dimensions, and motion may be updated. As such, the positioning and placement of a user may be detected such that a user's gestures may be detected, as described in further detail below. In some embodiments, a detected gesture from a user may enable or disable the user from the system or the user's standing placement (e.g., depth threshold) may be used to enable or disable the user. As such, a history of various characteristics of a user are recorded and updated.

If it is determined that a component is a user at block 640, then at block 645, the user's features are detected. In some embodiments, the features detected may comprise a user's head and hands. To do so, the user's torso and neck may first be located by segmenting the user component into a plurality of horizontal slices and moving upward until the width of the horizontal slices begins to diverge from the average width by a set amount. After finding the user's torso and neck, the user's head is identified by examining an area above the identified neck. Once the user's head is found, then the user's hands may be identified by performing a skeletonization of the user component. In some embodiments, the user's hands may be assumed to be the furthest points to the left and the right of the user's torso.

As seen in FIG. 6, at block 650, a user component's gestures are detected. As such, at block 650, a user raising his or her hand may be detected. In some embodiments, the detection of a user's gestures is based on the previously provided position of the user's features. In some embodiments, a user raising his or her hand may be detected by a vertical line comprising the user's hand position as well as a distance.

At block 655, a region map may be created. In some embodiments, the region map may be created based on the previously discussed categorizations and user information. The region map may comprise values of foreground, background, unclear, and unknown. For a background component, the region is set to background. In some embodiments, an invalid depth component may be set to unknown. If the component is set to unknown, then it may be checked to see whether it is close in proximity to a user such that it may be considered to be part of the user and as such categorized as a foreground component. If the user is enabled then the user component may remain as a foreground component, but if the user is disabled, then the user component may be re-categorized as a background component. As such, in some embodiments, the region map may comprise a categorization of pixels and/or components as foreground, background, unclear, or unknown.

At block 660 in FIG. 6, user history may be updated. In some embodiments, a user history is recorded and updated for each user. Each pixel in the user history may comprise a depth value and a confidence level. In some embodiments, the user history is updated for each received depth frame. The depth values may be updated using an exponential moving average. The confidence level may be updated so as to increase whenever a pixel is categorized as a user and the depth value is similar to the depth value in the user history. However, if the depth value is significantly different, then the confidence level may decrease. If a pixel is labeled as a background then the confidence level decreases, but if a pixel is labeled as another user, then the user confidence may decrease more slowly. As such, the user history enables the systems and methods disclosed herein to determine which pixels are associated to which user in a following frame.

At block 665, a background history may be updated similar to the user history as previously described. In some embodiments, the background history may comprise two different types of histories such as a trusted and non-trusted history. The non-trusted history may be updated per each frame. When a pixel is labeled as a background and the depth value matches the depth value in the non-trusted history then the age of the pixel increases. If the age of the pixel reaches a defined minimum age, then the pixel is re-categorized as trusted. If the depth value continues to match the depth value in the trusted history, then the confidence level may increase. However, if the depth value does not match, then the confidence level will decrease and if the confidence level reaches zero then the history at the pixel may be re-categorized as non-trusted.

As seen in FIG. 6, at block 670, a noise history is updated. In some embodiments, the noise history comprises a depth value and a noise level for each pixel. If a depth value does not match the depth value in the noise history, then the noise level increases. However if the depth values do match, then the noise level may decrease.

Figure 7:
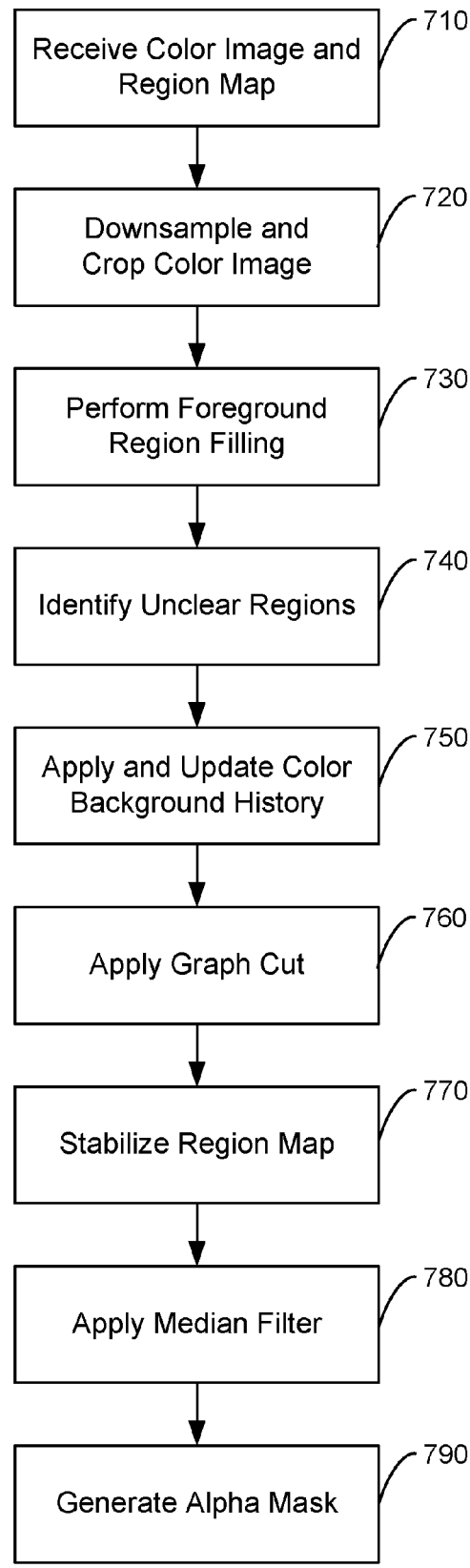
FIG. 7 is a flow diagram illustrating an example embodiment of a method for color based processing for identifying a foreground portion and a background portion of a video.

FIG. 7 illustrates a flow diagram of a method 700 for color based processing for the identification of a foreground portion and a background portion to create a foreground video. At block 710, a color image is received. In some embodiments, a region map as previously discussed with regard to FIG. 6 may also be received. At block 720, the received color image may be down sampled and cropped. For example, if the resolution of the color image is high definition (HD), the color image may be down sampled to a lower resolution, such as a VGA-equivalent size (e.g., 640×480 resolution). In some embodiments, the boundaries of the received color image may not comprise depth information. As such, the boundaries of the color image may be cropped out or removed so that further processing on the color image may be more efficient.

At block 730 of FIG. 7, a foreground region filling may be performed. For example, in some instances, the depth image as received in FIG. 6 may comprise a reduced resolution than that of the color image. In such an instance, a warped foreground region may comprise a sparse set of pixels while unknown pixels within the sparse set of pixels should be labeled as foreground pixels. As such, for each unknown pixel, a local window surrounding the pixel may be searched for other foreground pixels. If the unknown pixel is surrounded by foreground pixels, then it may be assumed that the unknown pixel lies within the sparse set of foreground pixels and should thus be re-categorized or labeled as a foreground pixel.

At block 740, unclear regions of the color image may be identified and segmented out of the foreground and background regions of the color image so that further processing may be performed on the unclear region. The unclear region may comprise the area or set of pixels of which may not yet be categorized as a background pixel or a foreground pixel. As previously discussed, foreground region filling may be performed on unknown pixels that are surrounded by foreground pixels. However, if an unknown pixel is not surrounded by foreground pixels, then it may be comprised within an unclear region. For example, an unclear region may comprise pixels at the position of a user's hair. An unclear region surrounding a user's body may be further identified by expanding the contour line of the user body outwards and/or inwards to become a region. As such, unclear regions may be identified.

At block 750, a color background history may be applied and updated. The color background history may comprise the accumulated color values of a plurality of color images. In some embodiments, the color background history may be used to remove unclear head pixels from the unclear region that comprise color values that are similar with the corresponding color values in the color background history. In some embodiments, the application of the color background history may be performed before the processes described with relation to block 740 so as to create a more efficient color image process. The color background history may also be used when applying a graph cut as described in further detail below.

At block 760, a graph cut may be constructed. For example, a graph cut may be constructed by all of the pixels in the identified unclear region, along with any foreground and background pixels that is adjacent to the unclear region. Each pixel is then connected to its 4 or 8 neighboring pixels and a source that represents the foreground and a sink that represents the background. In some embodiments, N-links may be inter-pixel links. Terminal links (T-links) may comprise links connecting a pixel to the source or the sink. The capacities of the N-links may be assigned based on the color contrast (L1 norm) between pixels based on the following equation:

$$cap_N(i,j) = \begin{cases} \lambda_N e^{-\beta_N \|p_i - p_j\|_1} & \text{if } \|p_i - p_j\|_1 < \delta_N \\ 0 & \text{else} \end{cases}$$

The capacities of the T-links may comprise the summation of several factors. One such factor may comprise the probability with respect to the Gaussian mixture models of the background and the Gaussian mixture model of the foreground. These models may be learned and updated using the detected background pixels from the previous color image frames. Another factor may comprise the temporal coherence of the region map of the current image frame and the region map of the previous image frame. For each pixel i in the graph, a value cap(i) (capacity) may be defined as the following equation:

$$cap(i) = \begin{cases} \lambda_T e^{-\beta_T \|p_i^{current} - p_i^{previous}\|_1} & \text{if } \|p_i^{current} - p_i^{previous}\|_1 < \delta_T \\ 0 & \text{else} \end{cases}$$

If the pixel i is categorized as a foreground pixel in the previous image frame's region map, then $cap_{source}(i)=cap(i)$ and $cap_{sink}(i)=0$. However, if the pixel i is categorized as a background pixel in the previous image frame's region map, then set $cap_{source}(i)=0$ and $cap_{sink}(i)=cap(i)$.

A third factor may comprise the color contrast (L1 norm) between a pixel in the graph and its color background history, as in the following equation:

$$cap_{source}(i) = 0;$$

$$cap_{sink}(i) = \begin{cases} \lambda_T e^{-\beta_T \|p_i^{current} - p_i^{previous}\|_1} & \text{if } \|p_i^{current} - p_i^{previous}\|_1 < \delta_T \\ 0 & \text{else} \end{cases}$$

In some embodiments, the $cap_{source}$ of the foreground pixels in the graph may be set to a large enough constant number to prevent its categorization as a background pixel by the graph cut algorithm. Similarly, the $cap_{sink}$ of the background pixel must also be set to a large constant number. As such, a fast binary graph cut may be performed on the graph based on a number of factors to obtain a segmentation between the foreground and background.

At block 770, the region map may be stabilized in order to reduce small temporal flickering of the foreground-background edges (e.g., edge waviness artifacts). Noisy pixels may be detected in the unclear region of the region map before the graph cut is performed by counting the foreground to background and background to foreground transition time of each pixel. For every new frame and for each pixel of the new frame, if the pixel doesn't transition from one categorized region to another categorized region (e.g., from a foreground region to a background region), its transition count may decrease. However, if the pixel does transition from a categorized region to another categorized region (e.g., from a background region to a foreground region), then the pixel transition count may increase. If a pixel's transition count is above a threshold value, the region categorization of the pixel may be copied from the pixel's region categorization from the previous image frame's region map.

In some embodiments, at block 780, a median filter may be applied to the identified foreground region in order to smoothen the foreground edges. The median filter may be applied in the following pseudo code manner:

```
For each pixel p in UC region
{
Count = 0;
    For each pixel p_i in the NxN support window around pixel p {
        If R(p_i) = UC, count++;
    }
    If(count<N*N/2), R(p) = BG;
    Else R(p) = FG;
}
```

At block 790, an alpha mask may be generated to convert the foreground categorized pixels to a 0xFF alpha value and convert other categorized pixels to a 0x00 alpha value. In some embodiments, this may comprise an up sampling for the alpha mask.

Figure 8:
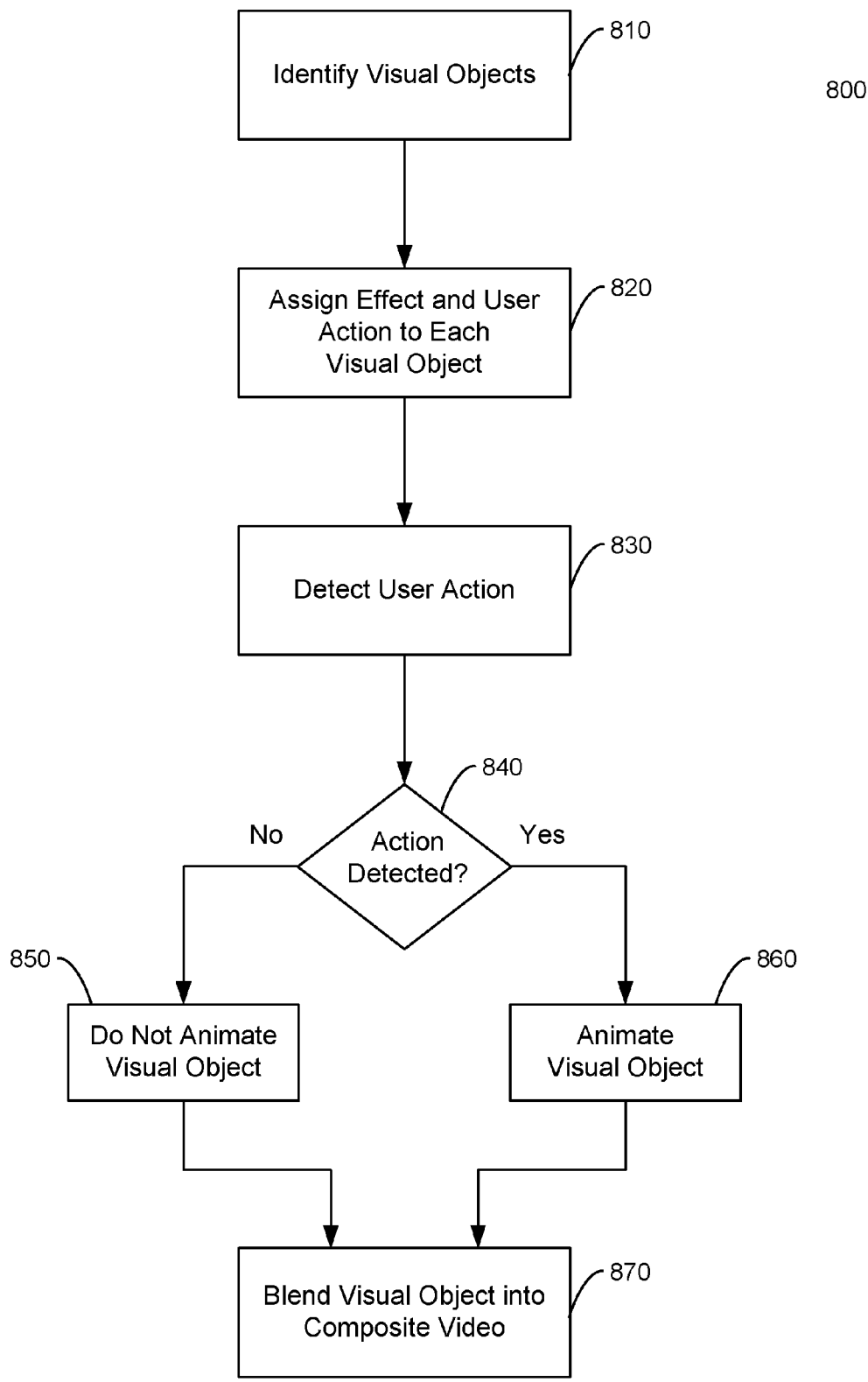
FIG. 8 is a flow diagram of an example method for gesture control inputs with relation to virtual objects.

FIG. 8 illustrates a flow diagram of an example method 800 for gesture control inputs with relation to virtual objects. In general, the method 800 identifies and assigns an effect to virtual objects, detects a user action, and animates and/or provides interaction with a virtual object.

At block 810, virtual objects are identified or received. A virtual object may comprise, but is not limited to, an image, video, slide, text box, bullet item, or a 3D computer graphic object. As such, a virtual object may comprise an object image that may be blended into the background feed and animated or interacted with by a user depicted within the foreground video. Each virtual object may be assigned an effect by a user and the effect may be activated and/or animated by using the live extracted foreground video of a user. At block 820, an effect and user action is assigned to each virtual object. For example, an effect may comprise an animation of a virtual object, movement of the virtual object within the background feed or composite video, and/or issuing of a command to change the background feed of the composite video. Each virtual object is also assigned a required user action to activate or interact with the virtual object, as described in further detail below. In some embodiments, a virtual object may be added or embedded into a background feed by a virtual object authoring application, program or module. For example, a user may select a type of virtual object to add or embed into a background feed or may select a virtual object to be the background feed. As such, the virtual object authoring application, program, or module may be used to assign the user action and the virtual object effect to a virtual object.

At block 830, a user action is detected. For example, a body mask of a user from the foreground video may be observed entering into a designated area (e.g. a 'hot spot') on a screen (2D) or in a particular area of a scene (e.g., 3D by using the depth information). Another user action may comprise the user body moving in a certain direction. For example, the user moving left, right, forward or backwards may comprise a user action. This may be accomplished by computing the user body's center of mass from the foreground video and then detecting the motion of the user body's center of mass. Further user actions may comprise the user pushing a virtual button. For example, the virtual button may be blended into the background feed of the composite video. The user's hand from the live foreground video may be detected to reach over the virtual button on the composite video and then the depth of the user's hand may be detected from the depth image information. If the depth value of the user's hand while positioned over the virtual button increases, then it may be assumed that the user is 'pushing' the virtual button and as such would active the virtual button. In some embodiments, the activation of the virtual button may comprise the changing of a slide or background, animating a virtual object that has been blended into the composite video, or any other interaction with the background feed.

Further user actions and virtual object effects may comprise a 'MovieEffect' that may comprise a check of whether a user body part is over a predefined 'hot spot' (e.g., a particular side of a screen) and upon detection of the user body entering the 'hot spot', an event may be triggered, such as the playing of an animation. A 'BulletEffect' may comprise the 'hot spot' detection and motion detection that may trigger an effect. For example, if a user body moves from a 'hot spot' A to a 'hot spot' B, then a presentation bullet may be advanced. However, if the user body moves from the 'hot spot' B to the 'hot spot' A, then the presentation bullet may go backwards such that the presentation bullet is no longer advanced. As such, the user body entering into a 'hot spot' may affect the background feed or a virtual object within the composite video. Thus, the 'hot spot' may comprise a 2D placement of the user body and/or a 3D placement of the user body. For example, a 2D 'hot spot' may comprise a user body entering a defined horizontal positioning, area, or placement and a 3D 'hot spot' may comprise a user body entering a defined horizontal and depth positioning, area, or placement. Moreover, the 'hot spot' approach may further consider a robust statistic, such as a median, instead of simple binary directions.

An 'ImageEffect' may comprise the detection of the horizontal position of the user. For example, if the user is in the center of the screen, he or she may be positioned in the center of the content of the background feed. If the user moves to one side, then the content of the background feed (e.g., text of a presentation slide or a video) may slide over to the other side of the composite video. As such, the user as depicted in the foreground video may seamlessly transition from standing in front of the content of the background feed to standing besides the content of the background feed. In some embodiments, the user's position may be detected by using a median of the horizontal position and/or the width of the user's body mask.

A 'Comparison Effect' may comprise similarities to the 'ImageEffect' as previously described, but content may be present on both sides of the user. For example, the foreground video may comprise a user and the background feed comprises text and/or videos on both sides of the user. The content on either side may re-size as the user moves from one side to the other side. For example, if the user moves to the left, then the content on the left may increase in size and the content on the right may decrease in size. In some embodiments, the user's position may be used to position the foreground video behind or in front of content.

A 'Graph Effect' may comprise a user displaying content that may otherwise be too large or wide to within a screen. For example, the content from a background feed or virtual object may be reduced in size so that it fits within the screen and the user (e.g., foreground video) may be positioned behind the content. However, additional content may be directly in front of the user and may be at a full resolution. As such, the user may emphasize a portion of the background feed or content while preserving an overview.

At block 840, the detected user action is processed. If the detected user action matches with the assigned user action for a virtual object, then the virtual object may be activated, animated, or interacted with. For example, if a virtual button has been assigned an effect of changing a presentation slide depicted in the background feed of the composite video and the virtual button has been assigned a user action of a user 'pushing' the button (as described above), then if the user of the live foreground video places his or her hand over the virtual button and the depth of the user's hand increases, then the virtual button may issue a command to change the presentation slide depicted in the background feed of the composite video. However, if the user action does not match with the virtual object's assigned user action, then the virtual object is not animated, activated, and/or interacted with. In some embodiments, the virtual object may comprise a video and a required user action of the user as depicted in the foreground video placing his or her hand over the virtual object in order to play the video.

At block 870, the virtual object is blended into the composite video that comprises the foreground video of the user. As such, the composite video comprises the foreground video (e.g., a depiction of a user) interacting with virtual objects.

Figure 9:
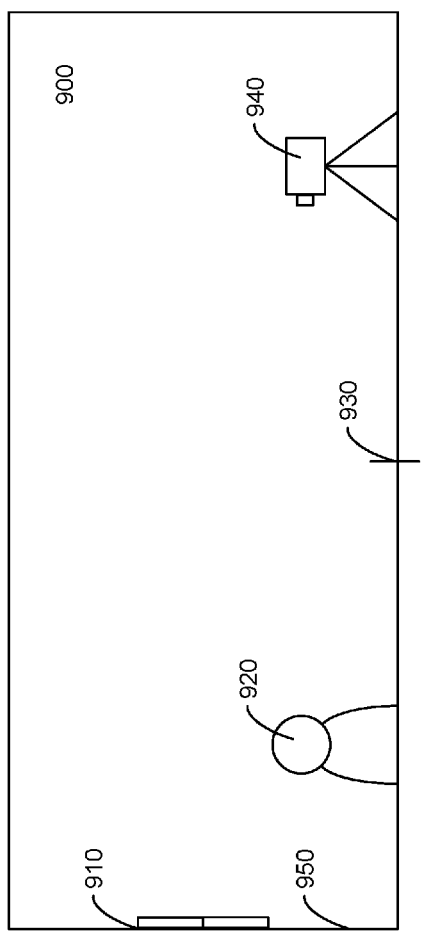
FIG. 9 illustrates an example setup comprising a threshold for displaying the foreground video with the background feed in accordance with some embodiments.

FIG. 9 illustrates an example setup 900 of a threshold for displaying the foreground video with the background feed in accordance with some embodiments of the present invention. As seen in FIG. 9, a setup 900 may comprise a camera 940 capable of receiving depth information and color information (e.g., a 3D camera). The setup 900 may further comprise a user presenter 920 in front of a wall or background 950. In some embodiments, the camera 940 may receive a depth and color video of the user presenter 920 in front of the background 950. The camera 940, or a connected computer system as discussed in further detail below, may subtract or remove the background 950 so as to create a foreground video as previously described with relation to FIG. 5. The foreground video may then be embedded into a background feed display 910. For example, the foreground video comprising the user presenter 920 may be embedded into a presentation slide.

In some embodiments, the foreground video of the user presenter 920 may be embedded into the background feed display 910 based on a control input. For example, the foreground video may be embedded into the background feed display 910 based upon a gesture from the user presenter 920 as previously described in FIG. 6, a mouse click, or a remote control input. In some embodiments, the foreground video may be embedded into the background feed display 910 based upon a user presenter threshold 930. For example, the user presenter threshold 930 may comprise a predefined distance from the camera 940 such that if the user presenter 920 meets the threshold limit, then the foreground video comprising the user presenter 920 may be embedded into the background feed display 910. For example, the user presenter threshold 930 may comprise a distance of 10 feet from the camera 940. As such, if the user presenter 920 is within the 10 feet user presenter threshold 930 limit, then the foreground video comprising the user presenter 920 may be embedded into the background feed 910. However, if the user presenter 920 is 15 feet away from the camera 940, then the user presenter 920 is outside of the user presenter threshold 930 and as such the foreground video will not be embedded into the background feed display 910.

As such, the camera 940 may receive a depth image comprising the user presenter 920. The camera 940 and/or related hardware or software may continuously monitor the depth image comprising the user presenter 920. If the user presenter 920 meets a defined threshold (e.g., a distance from the camera 940), then the systems and methods disclosed herein may embed a video of the user presenter 920 (e.g., the foreground video) into the background feed 910 (e.g., a presentation slide). However, if the user presenter 920 does not meet the defined threshold, then the systems and methods disclosed herein may not embed a video of the user presenter 920 into the background feed 910. Moreover, since the camera 940 may continuously monitor or receive the depth images, the foreground video may be repeatedly embedded or removed from the background feed 910 depending on the movement of the user presenter 910. As such, the systems and methods disclosed herein may detect a user presenter moving forward or backwards and use such user movement to embed a foreground video comprising the user presenter into a second video, image, presentation slide, or any other image or video.

In some embodiments, the systems and methods disclosed herein may dynamically resize a presentation of the background feed based on the positioning of the user presenter 920. For example, if the user presenter meets a threshold as previously described, then the background feed may shrink in size and the foreground video comprising the user presenter 920 may be embedded into the background feed 910. However, if the user presenter 920 is outside of the threshold limit, then the background feed may expand in size to occupy a whole screen and the foreground vide of the user presenter would not be embedded into the background feed. In some embodiments, the user presenter is detected as a body mask and the movement of the body mask is detected by the systems and methods disclosed herein.

Although the above example discusses using depth image of the user presenter 920 to embed or not embed the user presenter 920 into the background feed display 910, the camera 940 may also detect the user presenter 920 moving from side to side, and as such not changing in depth relative to the camera 940, to control whether or not to embed the foreground video into the background feed 910. For example, the user presenter 920 moving to the right may indicate that the foreground video should be embedded into the background feed display 910 and the user presenter 920 moving to the left may indicate that the foreground video should not be embedded into the background feed display 910.

In some embodiments, the systems and methods disclosed herein may embed the foreground video into the background feed 910 based on a control input such as a gesture control, mouse click, or remote control input. As such, a gesture from the user presenter 920 may embed the foreground video into the background feed 910. For example, the waving of a hand of the user presenter 920 may comprise a gesture control for the embedding of the foreground video into the background feed 910.

Figure 10:
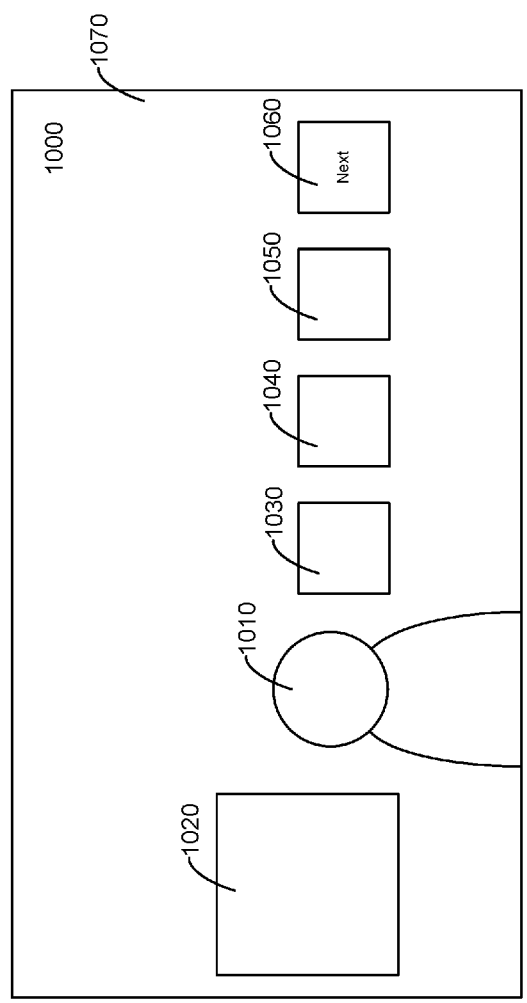
FIG. 10 illustrates an example configuration comprising a foreground video dynamically interacting with a portion of the background feed in accordance with some embodiments.

FIG. 10 illustrates an example composite video 1000 of a user presenter comprised within the foreground video dynamically interacting with a portion of the background feed in accordance with some embodiments. In general, the gesture or positioning of a user presenter may dynamically interact, adjust, or change the background feed.

As seen in FIG. 10, a composite video 1000 may comprise a foreground video 1010 of a user presenter embedded into a background feed 1070 that may comprise a second video. However, in some embodiments, the background feed 1070 may comprise a presentation slide. As illustrated, the background feed 1070 may comprise virtual objects 1020, 1030, 1040, 1050, and 1060. The virtual objects may comprise additional videos, images, presentation slides, or icons. Each of the virtual objects may be changed and/or interacted with based on the positioning, depth, and/or action of the user presenter 1010. For example, the background feed 1070 comprises a 'next' icon at virtual object 1060. In some embodiments, the user presenter 1010 may position his or her hand such that the depiction of the user presenter in the foreground video 1010 results in the user presenter's hand over the next button to provide a control input to change the background feed (e.g., to proceed to a next slide). In some embodiments, the user presenter may perform a gesture at the next button in order to provide a control input. For example, the user may wave his hand at the next button in order to provide a control input. In some embodiments, the systems and methods disclosed herein may detect the depth of the user presenter's hand in conjunction with the placement of the user presenter's hand within the composite video in order to provide the control input. Similar gestures from the user presenter 1010 may be used to expand, play a video, or interact with other portions 1020, 1030, 1040, and 1050 of the background feed. For example, in some embodiments, as the user presenter 1010 as seen in the composite video 800 moves from section 1020 to section 1040, the section 1020 may shrink in size and the section 1040 may increase in size as the user presenter 1010 foreground video is in closer proximity to the section 1040.

Figure 11:
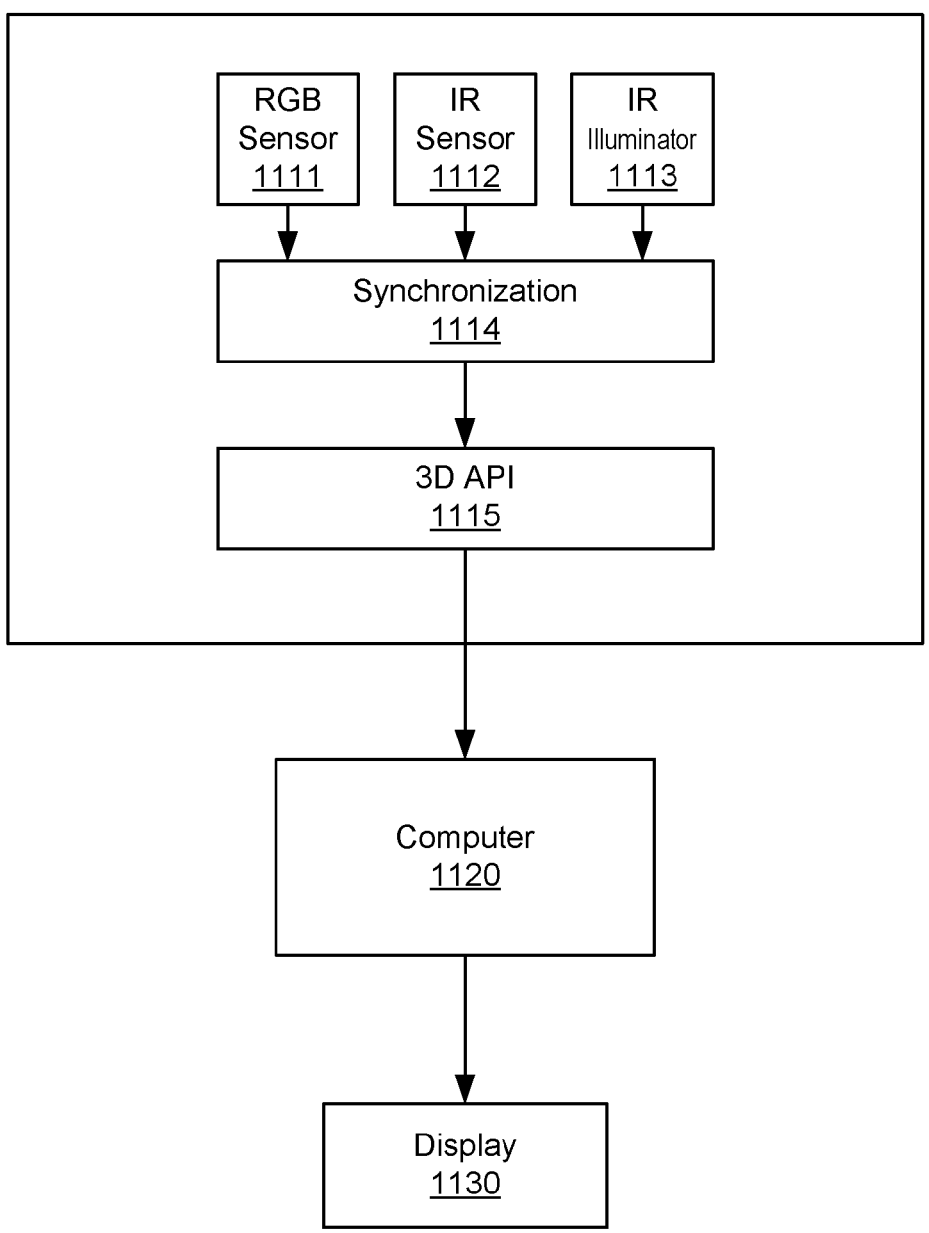
FIG. 11 illustrates an embodiment of a camera system for foreground video embedding in accordance with some embodiments.

FIG. 11 illustrates an embodiment of a camera system 1100 for the foreground video embedding systems and methods of the present invention. In general, the camera system 1100 comprises a camera 1110, computer 1120, and display 1130.

As seen in FIG. 9, a camera 1110 is connected to a computer 1120. The camera 1110 may comprise a three dimensional (3D) camera, depth camera, z-camera, range camera. In some embodiments, the camera 1110 may be comprised of a color or RGB camera and a depth camera or may comprise of a single camera with an RGB sensor and depth sensor. As such, the camera 1110 receives color information and depth information. The received color information may comprise information related to the color of each pixel of a video. In some embodiments, the color information is received from a Red-Green-Blue (RGB) sensor 1111. As such, the RGB sensor 1111 may capture the color pixel information in a scene of a captured video image. The camera 1110 may further comprise an infrared sensor 1112 and an infrared illuminator 1113. In some embodiments, the infrared illuminator 1113 may shine an infrared light through a lens of the camera 1110 onto a scene. As the scene is illuminated by the infrared light, the infrared light will bounce or reflect back to the camera 1110. The reflected infrared light is received by the infrared sensor 1112. The reflected light received by the infrared sensor results in depth information of the scene of the camera 1110. As such, objects within the scene or view of the camera 1110 may be illuminated by infrared light from the infrared illuminator 1113. The infrared light will reflect off of objects within the scene or view of the camera 1110 and the reflected infrared light will be directed towards the camera 1110. The infrared sensor 1112 may receive the reflected infrared light and determine a depth or distance of the objects within the scene or view of the camera 1110 based on the reflected infrared light.

In some embodiments, the camera 1110 may further comprise a synchronization module 1114 to temporally synchronize the information from the RGB sensor 1111, infrared sensor 1112, and infrared illuminator 1113. The synchronization module 1114 may be hardware and/or software embedded into the camera 1110. In some embodiments, the camera 1110 may further comprise a 3D application programming interface (API) for providing an input-output (IO) structure and interface to communicate the color and depth information to a computer system 1120. The computer system 1120 may process the received color and depth information and comprise and perform the systems and methods disclosed herein. In some embodiments, the computer system 920 may display the foreground video embedded into the background feed onto a display screen 1130.

Figure 12:
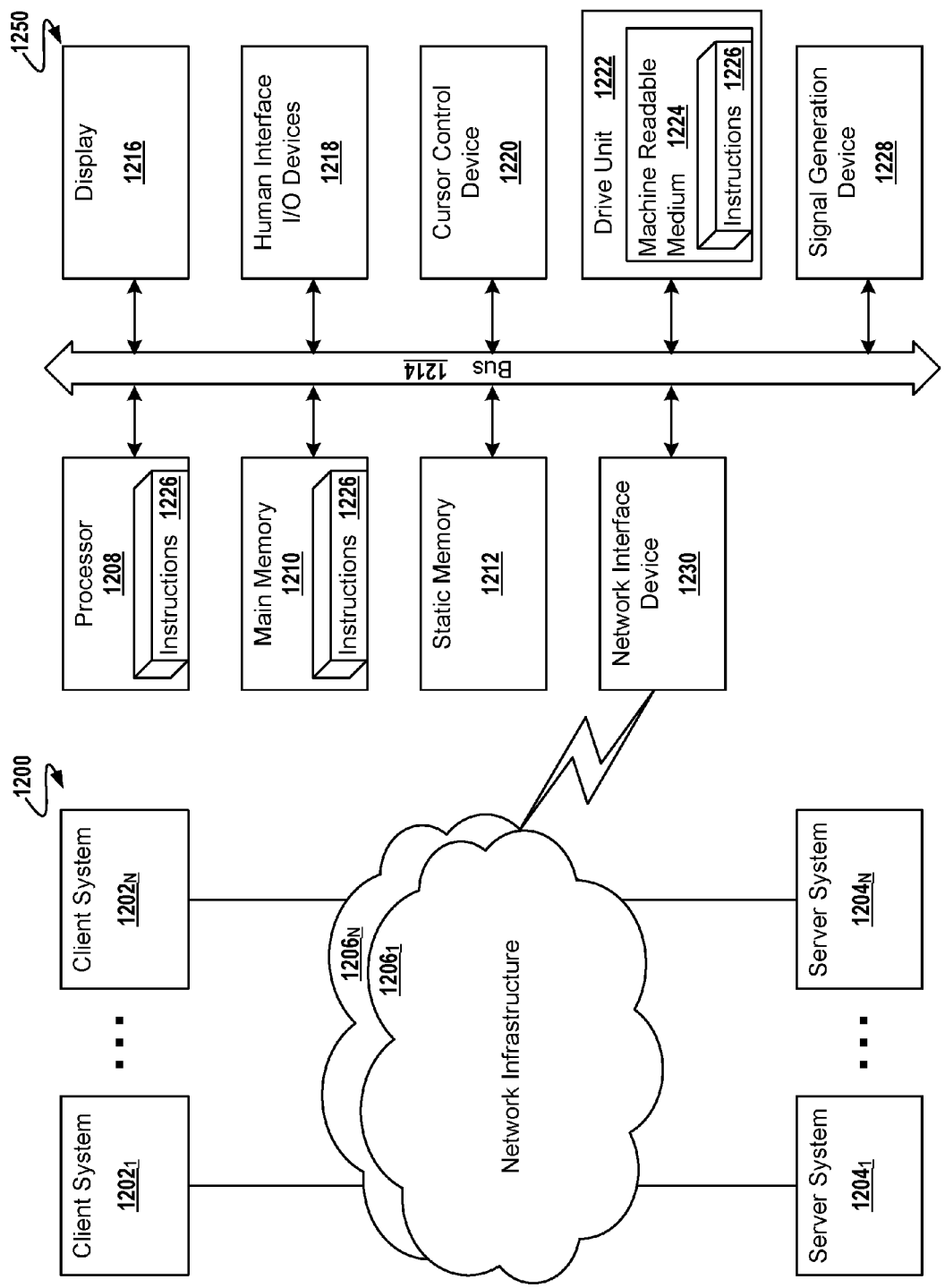
FIG. 12 illustrates an embodiment of a computer system and network system that incorporates the foreground video embedding systems and methods of the present invention.

FIG. 12 is a diagrammatic representation of a network 1200, including nodes for client computer systems 1202$_1$ through 1202$_N$, nodes for server computer systems 1204$_1$ through 1204$_N$, nodes for network infrastructure 1206$_1$ through 1206$_N$, any of which nodes may comprise a machine 1250 within which a set of instructions for causing the machine to perform any one of the techniques discussed above may be executed. The embodiment shown is purely exemplary, and might be implemented in the context of one or more of the figures herein.

Any node of the network 1200 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1250 includes a processor 1208 (e.g. a processor core, a microprocessor, a computing device, etc), a main memory 1210 and a static memory 1212, which communicate with each other via a bus 1214. The machine 1250 may further include a display unit 1216 that may comprise a touch-screen, or a liquid crystal display (LCD), or a light emitting diode (LED) display, or a cathode ray tube (CRT). As shown, the computer system 1250 also includes a human input/output (I/O) device 1218 (e.g. a keyboard, an alphanumeric keypad, etc), a pointing device 1220 (e.g. a mouse, a touch screen, etc), a drive unit 1222 (e.g. a disk drive unit, a CD/DVD drive, a tangible computer readable removable media drive, an SSD storage device, etc), a signal generation device 1228 (e.g. a speaker, an audio output, etc), and a network interface device 1230 (e.g. an Ethernet interface, a wired network interface, a wireless network interface, a propagated signal interface, etc).

The drive unit 1222 includes a machine-readable medium 1224 on which is stored a set of instructions (i.e. software, firmware, middleware, etc) 1226 embodying any one, or all, of the methodologies described above. The set of instructions 1226 is also shown to reside, completely or at least partially, within the main memory 1210 and/or within the processor 1208. The set of instructions 1226 may further be transmitted or received via the network interface device 1230 over the network bus 1214.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present invention has been described in terms of specific exemplary embodiments, it will be appreciated that various modifications and alterations might be made by those skilled in the art without departing from the spirit and scope of the invention. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method for selectively embedding a foreground video into a background feed, the method comprising:
   receiving, using a computer, depth and color information of a first video from at least one camera;
   creating a foreground video by identifying a foreground portion and a background portion of the first video based on the depth and color information of the first video, the creation of the foreground video comprising an inclusion of the foreground portion of the first video and a removal of the background portion of the first video;
   receiving the background feed comprising a second background;
   detecting, in the foreground video, a control input from a user;
   determining, based on the control input, whether or not to embed the foreground video into the second background;
   in response to a determination to embed the foreground video, creating an output video by embedding the foreground video into the second background; and
   in response to a determination to not embed the foreground video, creating the output video by using the second background without embedding the foreground video.

2. The method as set forth in claim 1, wherein the control input comprises a gesture from the user, the gesture detected by using the depth information of the first video.

3. The method as set forth in claim 1, wherein the control input comprises a depth of the foreground portion of the first video, the foreground portion is embedded into the background feed if the depth of the foreground portion is below a threshold value, the foreground portion is not embedded into the background feed if the depth of the foreground portion is above the threshold value.

4. The method as set forth in claim 1, wherein the control input comprises body motion of the user, the body motion comprising at least one of the user's horizontal movement, depth movement, and entering of a hot spot, the depth movement comprising the user moving forwards or backwards, the hot spot comprising a two dimensional (2D) or a three dimensional (3D) placement of the user, the 2D placement comprising a defined horizontal positioning of the user, the 3D placement comprising a defined horizontal and depth placement of the user.

5. The method as set forth in claim 1, wherein the background feed comprises a virtual object for changing the background feed to a third background, a placement of a user hand from the foreground video on the virtual object in the background feed changes the background feed to the third background.

6. The method as set forth in claim 1, further comprising adding, from a virtual object authoring module, a virtual object to the second background, the virtual object added is assigned a required user action and a virtual object effect.

7. The method as set forth in claim 1, wherein the background feed comprises at least one virtual object, each virtual object comprises a required user action and a virtual object effect, the foreground portion comprises a depiction of the user such that if the user from the foreground portion performs the required user action, the virtual object effect is activated in the output video.

8. The method as set forth in claim 1, wherein the second background comprises at least one of a presentation slide, video, shared computer desktop, and virtual scene.

9. The method as set forth in claim 1, wherein the depth information comprises a depth image for providing a distance of each pixel from the at least one camera.

10. A system for selectively embedding a foreground video into a background feed, the system comprising:
    at least one computer; and
    a non-transitory computer readable medium having stored thereon one or more programs, which when executed by the at least one computer, cause the at least one computer to:
    receive depth and color information of a first video from at least one camera;
    create a foreground video by identifying a foreground portion and a background portion of the first video based on the depth and color information of the first, the creation of the foreground video comprising an inclusion of the foreground portion of the first video and a removal of the background portion of the first video;
    receive the background feed comprising a second background;
    detect, in the foreground video, a control input from a user;
    determine, based on the control input, whether or not to embed the foreground video into the second background;
    in response to a determination to embed the foreground video, create an output video by embedding the foreground video into the second background; and
    in response to a determination to not embed the foreground video create the output video by using the second background without embedding the foreground video.

11. The system as set forth in claim 10, wherein the control input comprises a gesture from the user, the gesture detected by using the depth information of the first video.

12. The system as set forth in claim 10, wherein the control input comprises a depth of the foreground portion of the first video, the foreground portion is embedded into the background feed if the depth of the foreground portion is below a threshold value, the foreground portion is not embedded into the background feed if the depth of the foreground portion is above the threshold value.

13. The system as set forth in claim 10, wherein the control input comprises body motion of the user, the body motion comprising at least one of the user's horizontal movement, depth movement, and entering of a hot spot, the depth movement comprising the user moving forwards or backwards, the hot spot comprising a two dimensional (2D) or a three dimensional (3D) placement of the user, the 2D placement comprising a defined horizontal positioning of the user, the 3D placement comprising a defined horizontal and depth placement of the user.

14. The system as set forth in claim 10, wherein the background feed comprises a virtual object for changing the background feed to a third background, a placement of a user hand from the foreground video on the virtual object in the background feed changes the background feed to the third background.

15. The system as set forth in claim 10, further comprising a virtual object authoring module for adding a virtual object to the second background, the virtual object added is assigned a required user action and a virtual object effect.

16. The system as set forth in claim 10, wherein the background feed comprises at least one virtual object, each virtual object comprises a required user action and a virtual object effect, the foreground portion comprises a depiction of the user such that if the user from the foreground portion performs the required user action, the virtual object effect is activated in the output video.

17. The system as set forth in claim 10, wherein the second background comprises at least one of a presentation slide, video, shared computer desktop, and virtual scene.

18. The system as set forth in claim 10, wherein the depth information comprises a depth image for providing a distance of each pixel from the at least one camera.

19. A non-transitory computer readable medium carrying one or more instructions for selectively embedding a foreground video into a background feed, wherein the one or more instructions, when executed by one or more processors, cause the one or more processors to perform the steps of:
  receiving depth and color information of a first video from at least one camera;
  creating a foreground video by identifying a foreground portion and a background portion of the first video based on the depth and color information of the first video, the creation of the foreground video comprising an inclusion of the foreground portion of the first video and a removal of the background portion of the first video;
  receiving the background feed comprising a second background;
  detecting, in the foreground video, a control input from a user;
  determining, based on the control input, whether or not to embed the foreground video into the second background;
  in response to a determination to embed the foreground video, creating an output video by embedding the foreground video into the second background; and
  in response to a determination to not embed the foreground video, creating the output video by using the second background without embedding the foreground video.

20. The non-transitory computer readable medium as set forth in claim 19, wherein the control input comprises a gesture from the user, the gesture detected by using the depth information of the first video.

21. The non-transitory computer readable medium as set forth in claim 19, wherein the control input comprises a depth of the foreground portion of the first video, the foreground portion is embedded into the background feed if the depth of the foreground portion is below a threshold value, the foreground portion is not embedded into the background feed if the depth of the foreground portion is above the threshold value.

22. The non-transitory computer readable medium as set forth in claim 19, wherein the control input comprises body motion of the user, the body motion comprising at least one of the user's horizontal movement, depth movement, and entering of a hot spot, the depth movement comprising the user moving forwards or backwards, the hot spot comprising a two dimensional (2D) or a three dimensional (3D) placement of the user, the 2D placement comprising a defined horizontal positioning of the user, the 3D placement comprising a defined horizontal and depth placement of the user.

23. The non-transitory computer readable medium as set forth in claim 19, wherein the background feed comprises a virtual object for changing the background feed to a third background, a placement of a user hand from the foreground video on the virtual object in the background feed changes the background feed to the third background.

24. The non-transitory computer readable medium as set forth in claim 19, further comprising adding, from a virtual object authoring module, a virtual object to the second background, the virtual object added is assigned a required user action and a virtual object effect.

25. The non-transitory computer readable medium as set forth in claim 19, wherein the background feed comprises at least one virtual object, each virtual object comprises a required user action and a virtual object effect, the foreground portion comprises a depiction of the user such that if the user from the foreground portion performs the required user action, the virtual object effect is activated in the output video.

26. The non-transitory computer readable medium as set forth in claim 19, wherein the second background comprises at least one of a presentation slide, video, shared computer desktop, and virtual scene.

* * * * *